United States Patent
Montag et al.

(10) Patent No.: US 6,306,951 B1
(45) Date of Patent: Oct. 23, 2001

(54) POLYPHTHALAMIDE COMPOSITION

(75) Inventors: Ruth Ann Montag; George Albert Corbin, both of Naperville, IL (US); David William Garrett, Marietta, GA (US)

(73) Assignee: BP Corporation North America Inc., Chicago, IL (US)

(*) Notice: Subject to any disclaimer, the term of this patent is extended or adjusted under 35 U.S.C. 154(b) by 0 days.

(21) Appl. No.: 08/253,839

(22) Filed: Jun. 3, 1994

Related U.S. Application Data

(63) Continuation of application No. 08/021,303, filed on Feb. 23, 1993, now abandoned, which is a continuation-in-part of application No. 07/585,879, filed on Sep. 20, 1990, now abandoned.

(51) Int. Cl.[7] ..................................................... C08L 77/00
(52) U.S. Cl. ............................................. 524/505; 525/66
(58) Field of Search ............................... 525/66; 524/505

(56) References Cited

U.S. PATENT DOCUMENTS

| 3,842,029 | | 10/1974 | Saito et al. ................................ 260/37 |
| 4,849,471 | * | 7/1989 | Saito et al. ................................ 525/66 |
| 4,990,564 | * | 2/1991 | Taubitz et al. ............................ 525/66 |
| 5,071,924 | * | 12/1991 | Koch et al. ................................ 525/432 |

OTHER PUBLICATIONS

Plastic Additives Handbook—Hanser Publishers; 1987.

* cited by examiner

*Primary Examiner*—Ana Woodward
(74) *Attorney, Agent, or Firm*—Thomas E. Nemo

(57) ABSTRACT

Filled and unfilled polyamide compositions of improved toughness comprise a polyamide component comprising recurring aliphatic terephthalamide units and a modifying component comprising a functionalized block copolymer comprising styrene polymer blocks and rubber blocks comprising ethylene/propylene, ethylene/butylene, or ethylene/pentylene polymer blocks or a combination thereof.

7 Claims, No Drawings

POLYPHTHALAMIDE COMPOSITION

CROSS-REFERENCE TO RELATED APPLICATIONS

This application is a continuation of application Ser. No. 08/021,303 filed Feb. 23, 1993, now abandoned which is a continuation-in-part of U.S. application Ser. No. 07/585,879 filed Sep. 20, 1990 now abandoned.

FIELD OF THE INVENTION

This invention relates to polyphthalamide compositions of improved toughness. More particularly, the invention relates to toughened compositions comprising a high melting, crystalline polyamide component comprising recurring terephthalamide units and a modifier component comprising a functionalized block copolymer comprising polymerized styrene blocks and rubber blocks comprising ethylene/propylene, ethylene/butylene or ethylene/pentylene polymer blocks.

BACKGROUND OF THE INVENTION

As is known, polyamides generally exhibit a balance of thermal, strength and stiffness properties which make them suitable for many applications. However, impact strengths typically are low as measured by mechanical tests such as the Notched Izod Impact Test or the high speed instrumented Dart Impact Test. In some cases, elongation measured in tensile testing is also relatively low. Improvements in impact strength and elongation are needed for better performance of articles fabricated from polyamides for use in high impact applications and especially those in which the articles may be subject to cracks or have imperfections. Polyamides of improved impact strength over a broad range of temperatures would be particularly desirable.

Crystalline polyamides comprising at least about 50 mole percent aliphatic terephthalamide units exhibit particularly good thermal properties making them useful in relatively high temperature applications such as under-the-hood automotive parts. Other desirable properties of such compositions include their high strength and stiffness. However, impact strengths are relatively low. Further, such polyamides have relatively high melting points, e.g., about 290° C. or higher, and degradation temperatures of some of the materials do not greatly exceed their melting points; accordingly, requirements for melt processing the compositions are more rigorous and complex than those for lower melting polyamides such as nylon 66 which melts at about 260–265° C.

Various additives have been proposed for improving impact strength of polyamides. Generally, these additives are rubbery compositions that can be blended or incorporated into the polyamides to provide improvements in impact strength. Of course, it also is important that such improvements be achieved without substantial adverse effects on desirable properties of the polyamide. It also is important that the additives retain their effectiveness after processing of polyamide compositions containing the same and during use of articles prepared therefrom.

U.S. Pat. No. 4,427,828 issued Jan. 24, 1984, and U.S. Pat. No. 4,508,874, issued Apr. 2, 1985, both to Hergenrother et al., disclose impact resistant polyamide compositions containing about 50–90 wt. % polyamide having a number average molecular weight of at least 10,000 and about 10–50 wt. % of a pendant succinic anhydride group-containing reaction product of maleic anhydride with a hydrogenated polymer of a conjugated diene or hydrogenated random or block copolymer of a conjugated diene and a vinyl aromatic hydrocarbon. The disclosed hydrogenated polymer or copolymer has about 0.5–20% of its original unsaturation content before hydrogenation and at least 5 wt. % of the polyamide and the maleic anhydride-hydrogenated polymer or copolymer reaction product is present in the form of a graft polymer containing at least 20% polyamide. Polyamides mentioned in the patent include those prepared from various aminocarboxylic acids or lactams thereof or from dicarboxylic acids and diamines, including polycaprolactam, poly(hexamethylene adipamide), poly(hexamethylene isophthalamide), "poly(methoxylylene adipamide)" and hexamethylene adipamide/caprolactam, hexamethylene adipamide/hexamethylene isophthalamide, hexamethylene adipamide/hexamethylene terephthalamide, hexamethylene adipamide/hexamethylene azeleamide copolyamides and hexamethylene adipamide/hexamethylene azeleamide/caprolactam terpolyamides. Examples of various maleic anhydride-hydrogenated diene polymer and diene-vinyl aromatic copolymer adducts also are given. Included are those in which the diene is butadiene and the vinyl aromatic is styrene.

U.S. Pat. No. 4,783,503 issued Nov. 8, 1988, to Gergen et al. discloses impact resistant blends of a polyamide and a thermally stable, modified, selectively hydrogenated, block copolymer of a conjugated diene and a vinyl aromatic compound. The polyamides are semi-crystalline or amorphous resins having molecular weights of at least 5000. Polyamides named in the patent include poly(hexamethylene adipamide), poly(hexamethylene dodecaneamide), polycaprolactam, and adipic acid/isophthalic acid/hexamethylene diamine copolyamides. The disclosed, modified, selectively hydrogenated, block copolymer component has residual unsaturation in the polydiene block of about 0.5–20% of its original unsaturation content and is grafted in the vinylarene block with an electrophilic group. Examples of various dienes, vinyl aromatics and electrophiles are disclosed and the examples of the patent illustrate an acid-functionalized styrene-ethylene/butylene-styrene block copolymer containing 29 wt. % styrene and blends thereof with a commercial nylon 66 prepared at temperatures up to 285° C. The modified, hydrogenated block copolymers are said to exhibit greater thermal stability than materials prepared by the ENE process such as in Hergenrother et al.

Published European Patent Application 86201336.4 (Publication No. 0 211 467) of Gelles et al., published Feb. 25, 1987, discloses impact resistant polymeric compositions containing a polyamide or polyester and a thermally stable, acid-functionalized, selectively hydrogenated block copolymer of a vinyl aromatic compound and a conjugated diene in which unsaturation in the polydiene block is less than 10% of its original unsaturation and substantially all of the acid groups or derivatives thereof are grafted to a secondary or tertiary carbon of the polydiene group. Various polyamides, including poly(hexamethylene adipamide), poly(hexamethylene isophthalamide), poly(hexamethylene dodecaneamide), polycaprolactam and adipic acid/isophthalic acid/hexamethylene diamine and polyhexamethylene ter-co-isophthalamide copolyamides, are mentioned. Various diene and vinyl aromatic monomers are disclosed for preparation of block copolymers, 1,3-butadiene and styrene, respectively, being identified as preferred. The polydiene block is selectively hydrogenated and the hydrogenated result is grafted with an acid group or derivative to provide functionality. Preferred monomers for the grafting reaction are said to be maleic anhydride, maleic acid, fumeric acid and their derivatives and sulfonic acids. The examples illustrate maleic anhydride-functionalized styrene-ethylene/butylene-styrene block copolymer blends with nylon 66 prepared at temperatures up to 285° C. and having improved Izod impact strength relative to the neat nylon 66. Like the modified, hydrogenated block copolymers used according to Gergen et al., those of Gelles et al. are said to exhibit improved thermal stability relative to modified polymers prepared by the ENE process such as those according to Hergenrother et al.

A published advertisement for Kraton® FG 1901X by Shell Chemical Company, appearing in *Plastics Compounding* March/April, 1989, discloses a block copolymer having styrene and ethylene/butylene polymer blocks functionalized with maleic anhydride and utility thereof as an impact modifier for engineering thermoplastics, as a tie layer and as a compatibilizer for dissimilar scrap thermoplastics. Improvement in Izod impact strength resulting from incorporation of the material into nylon 66 also is reported in the advertisement as is the material's ability to withstand processing temperatures of engineering thermoplastics.

British Patent Specification 998,439 to E.I. dupont de Nemours and Company discloses blends of polyamides with olefin copolymers containing acid groups. The blends are described as having improved toughness as measured by the Izod Impact Test. The polyamides used according to this specification are derived from dicarboxylic acids and diamines, with nylon 66, 610, 6, 66/610 and 66/6 identified as preferred materials. The olefin copolymers are derived from 1-olefins, such as ethylene, propylene, butene-1, isobutene and styrenes or mixtures of 1-olefins, and an acidic component which may be incorporated by copolymerization with the olefin or by grafting to a polyolefin. Acidic components include alpha, beta-unsaturated carboxylic acids, such as acrylic acid, methacrylic acid, ethacrylic acid, maleic acid, and esters and anhydrides thereof and sulfonic acid group-providing compounds such as concentrated sulfuric acid and $SO_2Cl_2$. The olefin-acid group copolymer and polyamides are blended to finely disperse the former in the polyamide. The blends are described as incompatible but showing evidence of reaction between amine or acid end groups of the polyamide and acid groups of the olefin-acid component. The blends are said to contain 1–50% olefin-acid polymer and 50–90% polyamide.

U.S. Pat. No. 3,780,140 to Hammer, issued Dec. 18, 1973, discloses blends of ethylene-carbon monoxide-termonomer polymers with organic polymers, including polyamides, to improve properties of the latter in various respects, including toughness. As. termonomers used in preparing the polymers, unsaturated mono- and dicarboxylic acids of 3–20 carbon atoms and esters thereof, vinyl esters of $C_{1-18}$ saturated acids, vinyl $C_{1-18}$ alkyl ethers, acrylonitrile, methacrylonitrile and copolymerizable unsaturated hydrocarbons such as $C_{3-12}$ alpha-olefins are disclosed.

U.S. Pat. No. 4,174,358 to Epstein, issued Nov. 13, 1979, discloses compositions containing a polyamide having a molecular weight of at least 5,000 prepared from saturated $C_{4-12}$ dicarboxylic acids and $C_{4-15}$ diamines and a polymer dispersed in the polyamide as discrete particles 0.01 to 1 micron in size, having sites that adhere to the polyamide and tensile modulus of 1 to 20,000 and wherein the ratio of the polyamide tensile modulus to that of the polymer is greater than 10:1. The polymers dispersed in the polyamide are said to be represented by the formula $A_{(a)}$—$B_{(b)}$—$C_{(c)}$—$D_{(d)}$—$E_{(e)}$—$F_{(f)}$—$G_{(g)}$—$H_{(h)}$ wherein (a)–(h) are specified numerical values and repeat units A–H are also specified monomers from which the polymers are said to be derived. Compositions according to this patent are said to have improved ductility as measured by the Izod Impact Test.

U.S. Pat. No. 3,842,029 to Yokohama et al., issued Oct. 15, 1974, discloses noise, skid and impact resistant compositions containing glass fibers, certain thermoplastic polymers, including polyamides, and conjugated diene-monovinyl aromatic block copolymers. Disclosed polyamides include nylon 6, 66, 7, 610, 612, 11 and 12. Disclosed block copolymers include styrene-butadiene, styrene-isoprene, 1,3-pentadiene-vinyl toluene or -vinyl naphthalene copolymers.

U.S. Pat. No. 4,423,186 to Grigo et al., issued Dec. 27, 1983, discloses impact resistant polyamide molding compositions containing 35–99 weight % polyamide and 1–65 weight % of a partly crosslinked mixture of 5–80 weight % ethylene/(meth)acrylic acid (esters) and 95–20 weight % polybutadiene rubber. Disclosed polyamides are nylon 6, 66 and 6/66 copolymers.

Although these patents and publications disclose various additives for improving impact strength and ductility of various polyamides, there remains a need for improvement in such properties of polyamides containing a substantial proportion of terephthalamide units, particularly in view of the relatively high melting points and often narrow melt processing temperature ranges thereof which limit utility and effectiveness of many materials heretofore proposed as impact modifiers. In this regard, it is noted that Gergen et al. and Gelles, despite emphasizing improved thermal stability of their additives, as discussed hereinabove, illustrate use of such additives only with lower melting nylon 66 resins at temperatures of 285° C. or lower in their respective examples. Similarly, while the Shell Chemical Company advertisement for Kraton® FG 1901X mentions capability of the material to stand up to high processing temperatures, the supplier's Material Safety Data Sheet (MSDS 2,898-1, Jun. 22, 1987) for the product cautions against processing above 287° C.

An object of this invention is to provide modified polyamide compositions. Another object is to provide toughened polyphthalamide compositions. Another object is to provide polyphthalamide compositions having a desirable balance of properties including impact strength, tensile strength and thermal properties. Other objects are to provide a method for preparing such compositions and articles fabricated therefrom. Other objects will appear to those skilled in the art from the description and claims set forth herein.

The objects of this invention can be attained by providing polyamide compositions comprising a crystallizable polyamide component comprising at least about 50 mole percent recurring aliphatic terephthalamide units and a modifying component comprising a block copolymer having pendant succinic anhydride groups wherein the block copolymer comprises polymerized styrene blocks and rubbery blocks comprising ethylene/propylene, ethylene/butylene, or ethylene/pentylene polymer blocks or combinations thereof. In another aspect, these objects are attained by providing improved compositions comprising such a polyphthalamide component and a modifying component comprising the functionalized block copolymer as described above and, further, at least one additional rubbery polymer. Advantageously, the invented compositions exhibit significant improvements in toughness, including impact strength as determined by the Izod impact test and ductility as indicated by elongation during tensile testing, relative to the base polyphthalamide compositions. These improvements are frequently achieved despite preparation and processing of the invented compositions at temperatures approaching or even exceeding nominal degradation temperatures of the modifier components. Further, improvements in toughness can be achieved at relatively low levels of the functionalized, block copolymer component and without substantial loss of thermal properties such as heat deflection temperature. In addition the compositions not only retain their desirable properties, including improved Izod impact strengths, over a wide temperature range up to at least about 120° C., but also exhibit excellent retention of tensile strength, flexural modulus, and Izod impact strength when wet or subjected to humid environments.

DETAILED DESCRIPTION OF THE INVENTION

Briefly, the invented compositions comprise a polyphthalamide component comprising recurring aliphatic terephthalamide units and a modifying component comprising a pendant succinic anhydride-functionalized block copolymer comprising polymerized styrene blocks and rubbery blocks comprising ethylene/propylene, ethylene/butylene, or ethylene/pentylene polymer blocks or combinations thereof. In the invented compositions, the modifying component is present as a discontinuous phase within a matrix or continuous phase comprising the polyphthalamide component. Such compositions can be prepared by combining components comprising the polyphthalamide and modifying components and are useful for fabrication of articles, such as automotive under-the-hood parts, used in applications requiring high toughness, strength, and thermal resistance.

In greater detail, the polyphthalamide component of the invented compositions is a crystallizable polyamide comprising at least about 50 mole percent recurring terephthalamide units represented by the formula

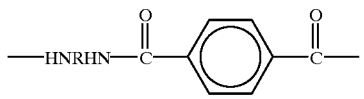

wherein R comprises at least one aliphatic hydrocarbyl radical. The polyphthalamide component generally has a molecular weight of at least about 5,000 and preferably is amine-terminated to facilitate incorporation of the modifying component into the polyphthalamide component. However, acid-terminated polyphthalamide components also are suitable because preparation of the invented compositions typically results in minor, though adequate, cleavage of carbonamide linkages and, in turn, generation of reactive amine end groups, to ensure suitable incorporation of the modifier component into the polyphthalamide component.

Preferably, aliphatic radicals R in the above formula comprise at least one straight chain, branched or cyclic, substituted or unsubstituted aliphatic radical having from about 4 to about 14 carbon atoms. These radicals are preferred because polyphthalamides comprising the same exhibit good crystallinity and desirable high temperature properties, together with melting and thermal degradation temperatures making them well suited for melt processing with the modifying components of the invented compositions. Specific examples of preferred radicals include tetramethylene, hexamethylene, 2,4-dimethyl hexamethylene, dodecamethylene, and p-cyclohexyl. Most preferably, R in the formula comprises a hexamethylene radical.

The polyphthalamide component has a melting point of at least about 270° C. as a result of its high content of terephthalamide units. Preferred polyphthalamide components are those melting at about 290° C. to about 330° C. because the same exhibit particularly desirable thermal properties and are more easily processed than higher melting polyphthalamides.

The polyphthalamide component of the invented compositions also can comprise a portion of recurring units as described above but wherein radicals R are replaced with one or more other types of divalent hydrocarbyl radicals, e.g. substituted or unsubstituted aromatic radicals. Specific examples of such other radicals include m-phenylene, p-phenylene, m-xylylene, p-xylylene, oxybis-phenylene and methylenebis-phenylene. When such other radicals are present, the proportion thereof should not be so great as to adversely affect desirable properties of the polyphthalamide component, such as strength, thermal properties and melt processibility. Preferably, not greater than about 30 mole percent of the recurring units of the polyphthalamide comprises such other radicals.

Polyphthalamides comprising, in addition to units represented by the formula above, one or more other types of carbonamide units also are suitable according to this invention. Such units can be aliphatic, e.g., hexamethylene adipamide, hexamethylene sebacamide, hexamethylene azeleamide, hexamethylene dodecamethylamide, hexamethylene cyclohexanedicarboxy-lamide, dodecamethylene adipamide, and units derived from lactams such as caprolactam; aromatic, e.g. m-xylylene isophthalamide, p-xylylene isophthalamide, oxybisphenylene isophthalamide or aliphatic-aromatic, e.g., hexamethylene isophthalamide, hexamethylene 2,6-naphthalene dicarboxylamide, m-xylylene adipamide, heptamethylene isophthalamide, dodecamethylene isophthalamide, m-phenylene adipamide. Preferred among such additional carbonamide units are hexamethylene adipamide, hexamethylene isophthalamide, and caprolactam units and combinations thereof.

Proportions of such other carbonamide units in the polyphthalamide compositions should not be such as to adversely affect processability or desirable properties of the invented compositions. Generally, at least about 50 mole percent of the carbonamide moieties of the polyamide composition is provided by units corresponding to the formula above to assure crystallinity and desirable strength and thermal properties. More preferably, about 55 to about 90 mole % of such moieties are provided by such units to achieve good properties and ensure melt processing compatibility of the polyphthalamide component and the modifying component.

A preferred polyphthalamide component of the invented compositions comprises a semicrystalline polyphthalamide of fast or intermediate crystallization rate comprising recurring units corresponding to formulas A, B and C. below in proportions of about 50 to about 95 mole percent A, 0 to about 35 mole percent B and about 5 to about 50 mole percent C.

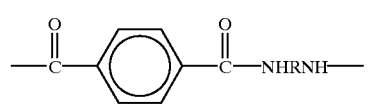

A

-continued

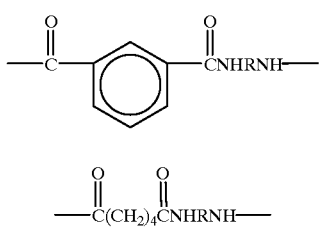

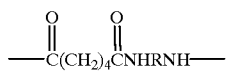

In the above formulas, R is as described hereinabove, with hexamethylene being most preferred. Also as described above, a minor proportion, e.g., up to about 30 mole percent, of radicals R can be replaced with one or more other radicals.

Particularly preferred among such polyphthalamides are those wherein the mole ratio of the units A, B and C ranges from about 65–95:25–0:35–5 because such compositions exhibit excellent thermal and mechanical properties. Such polyphthalamides have melting points of about 300 to about 350° C., glass transition temperatures ("$T_g$s") of about 90 to about 130° C., and inherent viscosities generally ranging from about 0.75 to about 1.4 dl/g, with about 0.9 to about 1.25 dl/g being preferred from the standpoint of properties of molded parts and ease of molding. Such polyphthalamides are disclosed in detail in commonly assigned U.S. Pat. No. 4,603,166 to Poppe et al., issued Jul. 29, 1986, which is incorporated herein by reference. Especially preferred among such polyphthalamides are those wherein R in the above formulas comprises hexamethylene. Most preferred among such polyphthalamides are those wherein R in formulas A, B, and C consists of hexamethylene and the mole ratio of the A, B, and C units is about 65:25:10.

Also disclosed in U.S. Pat. No. 4,603,166 and suitable as the polyphthalamide component of the invented compositions are polyphthalamides comprising at least two of the units A, B, and C shown above, in mole ratios of 65:35:0, 55:35:10, 60:30:10, 50:0:50 and 60:0:40, and wherein R is hexamethylene.

Polyphthalamides comprising recurring units A, B, and C, as depicted in the formulas above, in mole ratios of about 50–65:0–15:20–50, also are suitable. A specific example of a polyphthalamide having such a composition, disclosed in Table 10 of published European Patent Application No. 84300744.4 (Publication No. 0121984), published Oct. 17, 1984, is a polyphthalamide of terephthalic acid, isophthalic acid, and adipic acid in a mole ratio of 55/15/30 with hexamethylene diamine. Among such polyphthalamides, those wherein the mole ratio of the A, B, and C units is greater than 50 but less than 60: greater than 0 to less than 15: at least 25 but less than 50, and especially wherein R comprises hexamethylene, give particularly good results. Mechanical properties, including tensile and flexural strength and modulus, of such polyphthalamides together with their melt processibility and low water absorption tendencies and good retention of mechanical properties when wet, make compositions according to this invention comprising such polyphthalamides particularly well suited for fabrication of injection molded articles for use in humid environments. Melting points of such compositions range from about 290 to about 320° C.

Another example of a polyphthalamide component of the invented compositions is that prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Such polyphthalamides are described in detail in commonly assigned U.S. Pat. No. 4,617,342 to Poppe et al., issued Oct. 14, 1986, which is incorporated herein by reference. Such polyphthalamides melt at about 270 to about 345° C.

Also suitable for use in the invented compositions are polyphthalamides based on terephthalic acid and isophthalic acid compounds in a mole ratio of about 70–99:30–1 and hexamethylene diamine. These polyphthalamides are described in detail in commonly assigned U.S. Pat. No. 4,863,991 issued Sep. 5, 1989, to Poppe et al., which is incorporated herein by reference. Melting points range from about 310 to about 350° C.

The polyphthalamide component of the invented compositions can be prepared from appropriate starting materials, e.g., a dicarboxylic acid component comprising terephthalic acid or a derivative thereof and a diamine component comprising at least one aliphatic diamine or a derivative thereof, in suitable proportions by any suitable means. If desired, the acid component can comprise terephthalic acid compound and one or more additional dicarboxylic acids or derivatives thereof to provide copolyamides as described above. Similarly, mixtures of diamines can be used and lactams can be included in the starting materials if desired. An example of a suitable method for preparing the polyphthalamide component is disclosed in the aforementioned U.S. Pat. No. 4,603,166 and involves a salt preparation step, preferably conducted batchwise to achieve proper stoichiometry, wherein starting materials comprising dicarboxylic acid and diamine components and solvent are added to a suitable reaction vessel in appropriate amounts and maintained under conditions effective to cause salt formation but avoid appreciable conversion of salt to oligomers. Water is a preferred solvent and temperature is preferably maintained below about 120° C. to minimize conversion. Product of the salt preparation step can be introduced into a condensation section operated either batchwise or continuously. In the condensation section substantial conversion of salt to polymer takes place. The condensation product then typically is introduced into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like.

Commonly assigned U.S. Pat. No. 4,603,193, issued Jul. 29, 1986, and U.S. Pat. No. 4,831,108, issued May 16, 1989, both to Richardson et al. and incorporated herein by reference, also disclose preparation of such polyphthalamides by a process particularly suited for high terephthalamide content polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at short residence time and passing the resulting product to a finishing reactor to increase conversion thereof.

Copolyamides comprising at least about 50 mole percent recurring terephthalamide units together with one or more other types of recurring carbonamide units also can be prepared by blending appropriate homopolyamides or copolyamides in suitable amounts. For example, melt compounding a hexamethylene terephthalamide/hexamethylene isophthalamide copolyamide with nylon 66 can yield a hexamethylene terephthalamide/isophthalamide/adipamide terpolyamide. Melt compounding at temperatures above the melting point of the highest melting component in a suitable extruder is preferably employed in such preparation.

The modifying component of the invented compositions comprises a maleic anhydride modified, block copolymer comprising polymerized styrene blocks and rubber blocks comprising ethylene/propylene, ethylene/butylene, or ethylene/pentylene polymer blocks or a combination thereof. Polymerized styrene content of the modified block copolymer preferably is about 5 to about 50 weight percent because the same provides desirable improvements in toughness in the invented compositions. Best results are achieved when polymerized styrene content is about 10 to about 35 weight percent.

The rubber blocks of the modified block copolymer comprise ethylene/propylene, ethylene/butylene, or ethylene/pentylene polymer blocks or combinations thereof. Proportions of ethylene and propylene, butylene, or pentylene units in these blocks can vary widely. Such blocks can contain minor amounts of unsaturation in the ethylene, propylene, butylene, or pentylene groups. Preferably, unsaturation content is about 15 percent or less because higher levels can lead to inadequate thermal stability of the functionalized block copolymer.

The functionalized block copolymer generally comprises up to a bout 10 weight percent pendant succinic anhydride groups, with about 0.5 to about 5 weight percent being preferred because lower levels may lead to inadequate incorporation of the modifying component into the polyphthalamide component, while greater levels do not provide appreciable benefits over those achieved at about 5 weight percent. These groups are bonded predominantly to one or more of the secondary or tertiary carbons of the propylene, butylene, or pentylene groups or to benzylic carbons of the styrene groups.

Preferably, the block copolymer is a hydrogenated styrene-1,3-butadiene or -isoprene block copolymer with residual unsaturation of up to about 10% of its original unsaturation content because higher levels can result in decreased thermal stability and loss of toughening effect as a result of preparation and processing of the invented compositions. In such hydrogenated styrene-butadiene block copolymers, the rubber blocks comprise ethylene/butylene polymer blocks with proportions of ethylene and butylene units varying depending on the relative levels of 1,2 and 1,4 addition of the diene in the unhydrogenated copolymer. It also is preferred that the pendant succinic anhydride groups result from reaction of such a hydrogenated block copolymer with maleic anhydride.

A specific example of a preferred functionalized block copolymer according to the present invention is a styrene-ethylene/butylene-styrene block copolymer with pendant succinic anhydride groups identified as Kraton® FG 1901X rubber from Shell Chemical Company. The material also can also be described as a maleic anhydride-grafted, hydrogenated styrene-butadiene block copolymer. This product contains about 29 weight percent polymerized styrene, about 2 weight percent pendant succinic anhydride groups and has a glass transition temperature of its hydrogenated, polymerized butadiene block of about −42° C. Onset of thermal degradation of this material occurs between about 270° C. and about 315° C., as determined by Thermal Gravimetric Analysis, and the manufacturer's literature (MSDS 2,898-1, dated Jun. 22, 1987) states that, in processing, temperature should not be allowed to exceed 550° F. (287° C.).

The functionalized block copolymer can be prepared by any suitable technique. One such method is as disclosed in the previously discussed published European Patent Application No. 0211467 of Gelles et al., which is incorporated herein by reference. As disclosed therein, styrene-butadiene block copolymers having about 7 to about 100 percent 1,2-microstructure are prepared by polymerization of styrene and 1,3-butadiene with sequential or incremental addition of monomers or by coupling techniques. The monomers preferably are utilized so as to provide about 10 to about 50, and more preferably, about 10 to about 35 weight percent polymerized styrene in the block copolymer. Hydrogenation of such copolymers can be conducted by known techniques, for example, by hydrogenation of the block copolymer dissolved in a hydrocarbon solvent, such as cyclohexane, in the presence of Raney nickel, noble metal or soluble transition metal catalysts. The hydrogenation is conducted substantially to eliminate residual unsaturation in the diene block of the block copolymer although a small amount of residual unsaturation, e.g. up to about 10 percent of the original unsaturation content, may remain in the hydrogenated product The hydrogenated product, comprising styrene and ethylene/butylene blocks, then is grafted to provide about 0.5 to about 5 weight percent pendant succinic anhydride groups by reaction with maleic anhydride. Preferably, this reaction is conducted using a free radical initiator. The grafting reaction can be conducted in solution or in the melt. Similar techniques can be utilized for preparation and hydrogenation of styrene-isoprene or styrene-butadiene-isoprene co- or terpolymers and grafting of the hydrogenated polymers. Another suitable method, wherein pendant succinic anhydride groups are bonded predominantly to benzylic carbons of styrene units of the block copolymer, is that disclosed in the aforementioned U.S. Pat. No. 4,783,503 to Gergen et al., which is incorporated herein by reference.

The invented compositions comprise at least about 50 parts by weight polyphthalamide component and up to about 50 parts by weight modifier component. Preferred proportions are about 70 to about 95 parts by weight polyphthalamide component and about 5 to about 30 parts by weight modifier component. For maximum impact strength with a desirable combination of high tensile strength and flexural modulus, preferred proportions are about 70 to about 85 parts by weight polyphthalamide component and about 15 to about 30 parts by weight modifier component. Such compositions typically exhibit Notched Izod impact strengths of at least about 10 ft-lb/inch and, preferably, at least about 15 ft-lb/inch. For maximum tensile strength with ductile failure, that is, failure due to yielding of fabricated articles rather than breakage thereof, preferred proportions are about 85 to about 95 parts by weight polyphthalamide component and about 5 to about parts by weight modifier component. Notched Izod impact strengths of these compositions typically are at least about 2 ft-lb/inch and, preferably, at least about 2.5 ft-lb/inch.

In addition to the above-described functionalized block copolymer, the modifier component of the invented compositions can comprise one or more additional rubbery polymers. Up to about 90 weight percent of the modifier component can be such other rubbery polymer, while still achieving desirable increases in impact strength, elongation, ductility or combinations thereof while maintaining other desirable properties. Preferred levels of such other rubbery polymers will vary depending on the choice of rubbery polymer and desired product properties and can be determined by those skilled in the art. Generally, suitable additional rubbery polymers are elastomeric polymers having a tensile modulus up to about 50,000 psi determined according to ASTM D-638. In some cases, these additional rubbery polymers are capable of improving impact strength, elongation, or both of the polyphthalamides even in the absence of the functionalized block copolymer component. However, the combination of one or more additional polymers and the functionalized block copolymer may provide improvements in impact strength greater than either component alone, together with other benefits such as improved processibility, morphology, melt stability, and lower cost.

As such additional rubbery polymers, ethylene-higher alpha-olefin and ethylene-higher alpha-olefin-diene rubbers can be employed, as can rubbery polymers obtained by grafting such rubbers with reactive carboxylic acids or their derivatives such as acrylic and methacrylic acids and their esters and maleic anhydride. Examples of such higher alpha-olefins include propylene, butene-1, and hexene-1, with propylene being preferred.

Suitable dienes are nonconjugated dienes having 4 to about 24 carbon atoms, examples of which include 1,4-hexadiene, dicyclopentadiene, and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene rubbers having about 70 to about 95 mole percent ethylene units and about 5 to about 30 mole percent propylene units are preferred among these. In rubbers comprising polymerized diene monomer, diene unit content can range up to about 10 mole percent, with about 1 to about 5 mole percent being preferred. Functionalized rubbers generally comprise about 0.1 to about 5 weight percent functional groups. A specific example of a suitable functionalized ethylene-higher alpha-olefin copolymer rubber is a maleic anhydride-functionalized ethylene-propylene copolymer rubber comprising about 1 weight percent pendant succinic anhydride groups, identified as Exxelor® VA 1801 from Exxon. When used in the invented compositions, such rubbery polymers preferably constitute about 20 to about 80 weight percent of the modifier component to achieve a desirable combination of impact, strength, and stiffness, properties at reduced cost.

Also suitable as an additional rubbery polymer are non-functionalized, hydrogenated polydiene or vinyl aromatic-olefin copolymer rubbers. Examples include hydrogenated polybutadiene and styrene-butadiene rubbers with no more than about 10% unsaturation content to ensure thermal stability. In such copolymers, polymerized vinyl arene content generally ranges from about 5 to about 50 weight percent. Styrene-ethylene/propylene, -ethylene/butylene or -ethylene/pentylene rubbers prepared by hydrogenation of styrene-butadiene or styrene-isoprene copolymer rubbers are preferred among these, examples of which are those identified as Kraton G Polymer® from Shell Chemical Company. Preferably, rubbery polymers of this type, when used, constitute about 10 to about 50 weight percent of the modifier component to attain desirable properties, including high Notched Izod impact strength, at reduced cost Also suitable as an additional rubbery polymer to be included in the modifier component are alpha-olefin-carboxylic acid copolymers. Preferably, these copolymers contain at least about 2 mole percent carboxylic acid units because lower levels may provide inadequate toughening effect. Alpha-olefins from which the copolymers can be prepared preferably contain two to about ten carbon atoms, examples including ethylene, propylene, butene-1, isobutene, hexene-1, 4-methylpentene-1, styrene and para-methylstyrene. Preferred carboxylic acids include alpha, beta-unsaturated monocarboxylic acids such as acrylic acid, methacrylic acid, and ethacrylic acid. The alpha-olefin-carboxylic acid copolymers can be prepared by known free radical polymerization techniques or by grafting an acidic monomer to a polyalphaolefin. For best improvements in toughness with a desirable balance of other properties, preferred alpha-olefin-carboxylic acid copolymers are ethylene-acrylic acid copolymers. More preferably, such copolymers contain about 5 to about 15 weight percent acrylic acid units and have melt indices of about 0.5 to about 20 grams/10 minutes. A specific example of such a copolymer, containing about 10 weight percent acrylic acid units and having a melt index of 1.5 grams/10 minutes, is that designated Primacor® 1410 from Dow Chemical Company. When used in the invented compositions, alpha-olefin-carboxylic acid copolymers preferably constitute about 10 to about 90 weight percent of the modifier component, with about 65 to about 85 weight percent being more preferred from the standpoint of obtaining desirable improvements in properties, including Notched Izod impact strength, at reduced cost Also suitable as additional rubbery polymers are thermoplastic ionomer resins. Generally, these resins comprise an ethylene-carboxylic acid copolymer neutralized wholly or partially with metal cations such as zinc, sodium, or lithium. A specific example of such a polymer is a zinc-neutralized ethylene-methacrylic acid thermoplastic ionomer resin identified as Surlyn® 9020 available from DuPont. When used, these types of polymers preferably constitute about 20 to about 80 weight percent of the modifier component to achieve a desirable balance of properties.

Suitable additional rubbery polymers also include those referred to as "core/shell" type rubbery polymers. "Core/shell" as used herein refers to materials which contain a polymeric core physically or chemically associated with at least one surrounding shell of another polymeric material. Thus, core/shell polymers include both materials formed from bonding, e.g., grafting, between functional sites on the core and on an adjacent shell, and materials in which polymeric chains of the core interpenetrate polymeric chains of a shell, without grafting.

These materials can contain either a rigid core surrounded by a non-rigid layer, or a non-rigid core surrounded by a rigid layer. The rigid materials typically are methacrylate ester-vinyl aromatic compound polymers. The materials also can be copolymers of such compounds with acrylic esters. The non-rigid materials are typically diene rubbers such as polybutadiene.

Core/shell rubbery polymers are known and are available commercially, for example, from Rohm and Haas Company. An example of a graft copolymer type core/shell polymer is that comprising a diene rubber, an aromatic vinyl compound, and a methacrylate ester monomer in a multilayer structure wherein a rigid acrylate ester core is grafted to a non-rigid diene rubber layer, which in turn is grafted to another rigid layer formed from either an aromatic vinyl compound or an acrylate ester or mixtures thereof. Acryloid® KM 653, a product of Rohm and Haas Company, is believed to be exemplary of this type of material.

The compositions of the present invention also can include various additives to improve or modify various chemical and physical properties. Examples of such additives include flame retardants, stabilizers, anti-oxidants, processing aids, colorants, fillers, and reinforcing agents. Examples of suitable stabilizers include various metal halide and carboxylate salts, such as cuprous iodide and cupric acetate; alkali metal halides, such as potassium iodide; and combinations thereof. Ethylene-bis-stearamide and hexamethylene-bis-stearamide are examples of amide lubricants. Representative fibers suitable as; reinforcing agents include glass fibers, graphitic carbon fibers, amorphous carbon fibers synthetic polymeric fibers, aluminum fibers, aluminum silicate fibers, aluminum oxide fibers, titanium fibers, magnesium fibers, rock wool fibers, steel fibers, tungsten fibers, cotton, wool and wood cellulose fibers, etc. Representative filler materials include calcium silicate, silica, clays, talc, mica, carbon black, titanium dioxide, wollastonite, polytetrafluoroethylene, graphite, alumina trihydrate, sodium aluminum carbonate, barium ferrite, etc. The appropriate types and levels of such additives will depend on processing techniques and on the end use of the resultant product, and can be determined by those skilled in the art. In the case of fiber-filled compositions, according to the invention, suitable fiber levels range from about 10 to about 60 weight percent based on weight of the filled compositions, with glass and graphite fibers being preferred and glass fibers giving best results.

Other thermoplastic compositions also can be blended with the invented compositions if desired. Such polymers should be capable of withstanding temperatures employed in preparation and processing of the compositions. Examples include polar resins, such as polyesters, polycarbonates and polyarylethers, as well as nonpolar resins such as polyalphaolefins. Examples of suitable polyalphaolefins include polyethylenes (high, low, and linear low density), polypropylene, poly-1-butene and poly-4-methyl-1-pentene.

The compositions according to this invention can be prepared by any suitable means. Conveniently, components comprising the polyphthalamide and modifying components, in powder, pellet, or other suitable form, are melt compounded at temperatures effective to render the resinous components molten, in a high shear mixer, e.g., a twin-screw extruder, to obtain a desirably uniform blend. When using a modifier component comprising the maleic anhydride-grafted block copolymer and one or more additional rubbery polymers, the modified block copolymer and additional rubber can be added separately or in combination to the polyphthalamide component. Kneading blocks or other suitable mixing elements can be employed to facilitate mixing. To minimize degradation of the invented compositions and the polyphthalamide and modifying components, preferred temperatures when using a twin-screw mixer are equal to or up to about 20° C. greater than the melting point of the polyphthalamide component. Screw speed and temperature should be selected so as to achieve good mixing of components of the invented compositions without exceeding a melt temperature of about 360° C., at which properties of the final compositions may be sacrificed as a result of degradation. Combining the components in solid form, such as powder or pellets, prior to melt compounding can be conducted to facilitate the latter. Particulates, fibers, and other additives can be incorporated into one or more of the components prior to combining them or into the compositions by physical mixing with the same in powder or pellet form and then extrusion compounding the result, by feeding the additives, particulates or fibers to the molten composition in an extruder or other compounding apparatus or by other suitable methods.

The invented compositions are particularly useful as unfilled and filled injection molding compounds for production of molded objects of high impact strength and ductility. Examples of such objects include lawnmower housings, automobile radiator housings, power tool shrouds, and automobile valve cover housings. Injection molding of such compositions generally is conducted using standard injection molding equipment.

The invented compositions can also be formed into fibers, film, sheets, or other forms by suitable techniques, e.g. melt spinning of fibers, extrusion of sheets or films, or used as matrix materials or binders for composite or laminated structures.

The present invention is described further in connection with the following examples, it being understood that the same are for purposes of illustration and not limitation.

Polyphthalamide Preparations

Polyphthalamides used in the following examples are described in Table I below and were prepared substantially as described below.

To a large, stainless steel, stirred reactor having an oil jacket heating system was added a 75 weight percent solution of hexamethylene diamine in water. The solution was diluted to about 44 weight percent diamine with deionized water and then adipic acid, isophthalic acid and terephthalic acid, in amounts corresponding substantially to the mole ratios reported in Table I below, were added. The mole ratio of diamine to total acids was about 1.05–1.1:1. About two mole percent benzoic acid, based on total moles of diacids, was added as a capping agent. Temperature increased during addition of the acids to about 70° C. Zinc hypophosphite catalyst (1000 parts per million calculated as hypophosphite ions) then was added to the reactor after which it was sealed, purged with nitrogen, leaving a 5.64 kg/cm$^2$ (80 psig) nitrogen blanket in the reactor, and then heated to about 120° C. and held at that temperature. A second such reactor was charged, purged and heated in like manner and the two reactors were used in parallel to provide continuous feed of salt solution to downstream processing by alternating between the two reactors.

Contents of the salt reactors were pumped continuously to a jacketed, oil-heated, stirred tank and maintained under pressure of 10.5 kg/cm$^2$ (150 psig) therein using at microprocessor-controlled Research Control Valve. The reactor was heated to about 220° C. Residence time in the reactor under such conditions was about 15 minutes, resulting in decrease in water content of the salt solution.

Contents of the tank were pumped continuously to and through two jacketed, oil heated, stainless steel pipes of 0.95 cm inner diameter and lengths of 274 and 401 cm in series at a rate of about 8.2 kg/hour using a dual headed Bran-Lubbe piston pump. The first pipe was maintained at about 315–325° C. and the second at about 325–335° C.; both were maintained under pressure of about 128 kg/cm$^2$ (1800 psig) using a microprocessor-controlled Research Control Valve.

Contents of the second heated pipe were passed continuously through the Research Control Valve to a jacketed tube of about 0.94 cm inner diameter and about 274 cm 30 length, equipped with thermocouples to monitor temperatures in the tube and between the outer wall of the tube and inner wall of the jacket, under pressure of about 7 kg/cm$^2$ (100 psig) with 325–345° C. heat exchange fluid circulating in the heating jacket. Flashing of volatiles in the feed to the tube occurred in an upstream portion thereof.

Contents of the tube, comprising water vapor and molten polymer, were passed through another microprocessor-controlled Research Control Valve and introduced onto the screws of a Werner and Pfleiderer Corporation ZSK-30, twin-screw extruder. Volatiles were allowed to escape through a front vent in the extruder barrel, maintained under vacuum of 20 inches of mercury, and a rear vent in the barrel. Polymer was conveyed between screw flights with the screws rotating at 100 rpm and the extruder barrel heated at 300 to 330° C. Polymer was extruded through a water bath and then chopped into pellets.

Prior to use in the following examples, the polyphthalamides were dried for 16 hours at 110° C. under vacuum.

Compositions and properties of the polyphthalamides used in the following examples are shown in Table I wherein mole ratios of the hexamethylene terephthalamide, isophthalamide and adipamide units, if present, of such compositions appear under the heading "Mole Ratio (6T/6I/6A)".

TABLE I

| Polyphthalamide | Mole Ratio (6T/6I/6A) | IV* (dl/g) | Melting Point (° C.) |
|---|---|---|---|
| A | 65/25/10 | 1.0 | 300–310 |
| B | 60/15/25 | 0.95 | 301 |
| C | 65/35/0 | 1.05 | 302 |
| D | 50/50/0 | 0.97 | — |

*IV is inherent viscosity determined at 30° C. on a 0.4 weight percent solution in a 60/40 weight/weight phenol/1,1,2,2-tetrachloroethane solvent mixture.

EXAMPLE 1

1816 grams of Polyphthalamide A and 454 grams of a maleic anhydride-functionalized styrene-ethylene/butylene styrene block copolymer containing about 29 weight percent polymerized styrene and about 2 weight percent pendant succinic anhydride groups, identified as KRATON® FG1901X Polymer from Shell Chemical Company, were tumbled in a five gallon jar for about five minutes. The dry blend then was fed to a ZSK-30 twin screw extruder and melt compounded using barrel temperature settings of about 400° F. in an initial zone, 600° F. in four intermediate zones, and 580° F. in a final zone at a throughput rate of 30 pounds per hour and screw speed of 150 rpm under vacuum of 10 inches of mercury. The compounded melt was pelletized and the pellets then were dried at about 110° C. for about 16 hours under vacuum and molded into test specimens using an Arburg injection molding machine operated at barrel temperatures of 570° F. in a first zone, 590° F. in a second zone, and 590° F. in a final zone. Mold temperature was 250° F. Test specimens were tested for Notched Izod impact strength following the procedure of ASTM D-256, yield tensile strength (hereinafter "YTS") and elongation at break (hereinafter "EB") following the procedure of ASTM D-638-1, flexural modulus (hereinafter "FM") following the procedure of ASTM D-790 and heat deflection temperature (hereinafter "HDT") at 264 psi following the procedure of ASTM D-648. In all tests, five specimens were tested. Results are reported in Table II.

EXAMPLES 2–6

The procedure of Example 1 was repeated using different proportions of Polyphthalamide A and the modified block copolymer. In Examples 2 and 3, screw speed was 230 rpm and in Example 2A, screw speed was 300 rpm. Results are reported in Table II. Polyphthalamide A in Examples 1 and 6 was from the same lot and that in Examples 2–5 was from another lot; properties of the polyphthalamides are reported in the table as Control 1 and Control 2, respectively, for comparison.

TABLE II

| Example (Polyphthalamide/ Modifier pbw) | Notched Izod (ft. lb/in) | YTS (kpsi) | EB (%) | FM (kpsi) | HDT (° F.) |
|---|---|---|---|---|---|
| 1 (80/20) | 18.9 | 10.6 | 32 | 342 | — |
| 2 (75/25) | 14.0 | 9.5 | 40 | 294 | 234 |
| 2A (75/25) | 11.4 | 10.0 | 25 | — | 245 |
| 3 (85/15) | 16.3 | 11.7 | 23 | 307 | 236 |
| 4 (90/10) | 11.6 | 14.2 | 18 | 478 | 248 |
| 5 (95/5) | 2.6 | 15.8 | 15 | 491 | 248 |
| 6 (98/2) | 1.7 | 16.4 | 12 | 493 | — |
| Control 1 (100/0) | 0.7 | 15.6* | 5.3 | 517 | 248 |
| Control 2 (100/0) | 1.0 | 14.4* | 4.4 | 529 | 253 |

*Samples did not yield; reported values are break tensile strengths.

As can be seen from Examples 1–6 and Table II, dramatic increases in Notched Izod impact strengths and elongations were achieved at 15–25 wt. % modifier with substantial retention of heat deflection temperatures and flexural modulus and at high yield tensile strengths. Even low levels of the modifying component in Examples 5 and 6 gave some increase in Notched Izod impact strength relative to the controls.

EXAMPLES 7–9

Following generally the procedure of Example 1, test specimens were prepared from 80 parts by weight of Polyphthalamides B-D and 20 parts by weight of the functionalized block copolymer used in Examples 1–6. The composition in Example 7 also included 0.2 parts by weight of an amide lubricant identified as Kemamide S221 from Witco. Compounding was conducted using a ZSK-30 twin-screw extruder with barrel temperature profiles of about 350–355° F., 445–450° F., 515–525° F., 520–535° F. 595–620F., 595–620° F., 575–585° F. and at throughputs of 30–32 pounds per hour.

Specimens were tested and results are reported in Table III; results also are reported for eat Polyphthalamides B, C, and D as Controls 3, 4, and 5, respectively.

TABLE III

| Example (Polyphthalamide) | Notched izod (ft. lb/in) | YTS (kpsi) | EB (%) | FM (kpsi) | HDT (° F.) |
|---|---|---|---|---|---|
| 7 (B) | 18.3 | 10.5 | 34 | 324 | 227 |
| 8 (C) | 6.8 | 12.2 | 28 | 343 | 258 |
| 9 (D) | 17.2 | 9.1 | 63 | 265 | 234 |
| Control 3 (B) | 0.7 | 13.7* | 4 | 476 | 219 |
| Control 4 (C) | 1.8 | 19.0 | 16 | — | — |
| Control 5 (D) | 2.2 | 14.1 | 57 | 431 | 235 |

*Samples did not yield; reported value is break tensile strength.

As in the previous examples, substantial increases in notched Izod impact strength with substantial retention of thermal and mechanical properties were achieved in Examples 7–9.

EXAMPLES 10–29

Following generally the procedure of Example 1, compositions were prepared from Polyphthalamide A, the modified block copolymer used in Examples 1–9 and various additional rubbery polymers in various proportions. The Polyphthalamide A used in these examples was from various lots; that in Examples 10, 15 and 17 was the same as in Examples 1 and 6, and that in Examples 14, 16, 19, 20, 22 and 25 was the same as in Examples 2–5. Test specimens were prepared and tested substantially as in Example 1 and results are reported in Table IV. The compositions in these examples were as follows:

Example 10: Polyphthalamide A (80 parts by weight), modified block copolymer as in Example 1 (13 parts by weight), and a styrene-ethylene/butylene-styrene block copolymer containing about 13 weight percent polymerized styrene units, identified as Kraton® G1657MX Polymer from Shell Chemical Company (7 parts by weight);

Example 11: Components as in Example 10 were used in proportions of 80/18/2 parts by weight, together with 0.2 parts by weight of the lubricant used in Example 7;

Example 12: Components were as in Example 11 in proportions of 80/16/4/0.2 parts by weight;

Example 13: Components were as in Example 10 in proportions of 70/6/24 parts by weight;

Example 14: Components were as in Example 10, except that the additional rubber was a styrene-ethylene/butylene-styrene block copolymer containing about 32 weight percent polymerized styrene units, identified as Kraton® G1651 Polymer from Shell, in proportions of 80/5/15 parts by weight;

Example 15: Components were as in Example 10 in proportions of 80/7/13 parts by weight;

Example 16: Components were as in Example 14 in proportions of 80/13/7 parts by weight;

Example 17: Components were as in Example 11 in proportions of 80/10/10/0.25 parts by weight;

Example 18: Polyphthalamide A (80 parts by weight), modified block copolymer as in Example 1 (17 parts by weight) and a zinc-neutralized, ethylene-methacrylic acid thermoplastic ionomer resin having a melt index of 1 g/10 minutes, identified as Surlyn® 9020 from DuPont (3 parts by weight);

Example 19: Components were as in Example 18 in proportions of 75/21.25/3.75 parts by weight;

Example 20: Components were as in Example 18 in proportions of 80/3/17 parts by weight;

Example 21: Components were as in Example 18 in proportions of 85/12.75/2.25 parts by weight;

Example 22: Polyphthalamide A (80 parts by weight), modified block copolymer as in Example 1 (4 parts by weight), ethylene-acrylic acid copolymer containing 9.5 wt. % acrylic acid units and having melt index of 1.5 g/10 min. identified as Primacor® 1410 from Dow (16 parts by weight), and the lubricant as in Example 7 (0.2 parts by weight);

Example 23: Components were as in Example 22, except no lubricant was included. Proportions were 75/21.2/3.8 parts by weight;

Example 24: Components were as in Example 22, except the additional rubber was an ethylene-acrylic acid copolymer identified as Primacor® 1410 XT from Dow, in proportions of 5517.9/37.1/0.25 parts by weight;

Example 25: Components were as in Example 22 in proportions of 70/5.25/24.75/0.25 parts by weight;

Example 26: Components were as in Example 24 in proportions of 70/5.25/24.75/0.25 parts by weight;

Example 27: Components were as in Example 22 in proportions of 80/3.5/16.5/0.25 parts by weight;

Example 28: Polyphthalamide A (80 parts by weight), modified block copolymer as in Example 1 (5 parts by weight), maleic anhydride-functionalized ethylene-propylene copolymer rubber identified as Exxelor® VA 1801 from Exxon (15 parts by weight), and the lubricant as in Example 7 (0.25 parts by weight);

Example 29: Components were as in Example 28 in proportions of 80/10/10/0.25 parts by weight;

Example 30: Components were as in Example 28 in proportions of 80/15/5/0.25 parts by weight.

TABLE IV

| Example | Notched IZOD (ft-lb/in) | YTS (kpsi) | EB (%) | FM (kpsi) | HDT (° F.) |
|---|---|---|---|---|---|
| 10 | 18.9 | 11.1 | 28 | 353 | — |
| 11 | 18.6 | 11.3 | 31 | 340 | 238 |
| 12 | 19.1 | 11.2 | 31 | 345 | 240 |
| 13 | 1.5 | 1.0 | 32 | 11 | 234 |
| 14 | 2.5 | 10.8 | 10 | 327 | 241 |
| 15 | 8.3 | 9.5 | 6 | 314 | — |
| 16 | 12.5 | 10.8 | 22 | 346 | 237 |
| 17 | 17.6 | 11.4 | 29 | 353 | 239 |
| 18 | 17.3 | 10.7 | 27 | 333 | 235 |
| 19 | 14.6 | 10.2 | 27 | 337 | 237 |
| 20 | 16.0 | 10.8 | 21 | 342 | 242 |
| 21 | 9.9 | 12.0 | 16 | 367 | 244 |
| 22 | 18.3 | 10.3 | 32 | 310 | 236 |
| 23 | 11.5 | 9.9 | 29 | 313 | 240 |
| 24 | 12.9 | 6.1 | 72 | 126 | 181 |
| 25 | 17.5 | 8.0 | 64 | — | 233 |
| 26 | 5.6 | 8.9 | 43 | 253 | 232 |
| 27 | 19.7 | 10.6 | 47 | 303 | 239 |
| 28 | 18.6 | 10.1 | 34 | 344 | 242 |
| 29 | 18.5 | 10.1 | 32 | 317 | 253 |
| 30 | 19.6 | 10.3 | 35 | 322 | 246 |

As can be seen from these examples and Table IV, significant increases in Izod impact strength were achieved using the modified block copolymer and a second rubbery polymer, except in Examples 13 and 14 wherein low levels of the modified block copolymer were used with higher levels of a styrene-butylene-ethylene copolymer. As shown in Examples 20, 25, 27 and 28, however, with the other additional rubbery polymers used, dramatic increases in Izod impact strength were attained even at low levels of modified block copolymer.

CONTROLS 6–21

In these Controls, compositions were prepared from Polyphthalamide A and various of the additional rubbery polymers used in Examples 10–30 or various other rubbery polymers and test specimens were molded and tested. Results appear in Table V. The specific compositions and compounding procedures used in these controls were as follows:

Control 6: Polyphthalamide A (70 parts by weight) and an acrylonitrile-butadiene-styrene polymer, identified as Cycolac L from Borg-Warner (30 parts by weight) were melt compounded using a ¾-inch Brabender single screw extruder at a barrel temperature profile of 275° C./280° C./275° C./275° C. and screw speed of 100 rpm.

Control 7: Polyphthalamide A (70 parts by weight) and a maleic anhydride-functionalized acrylonitrile-butadiene-styrene polymer (30 parts by weight), prepared by combining 326 grams of the acrylonitrile-butadiene-styrene polymer used in Control 6 with 3.2 grams maleic anhydride and 0.32 grams dicumyl peroxide dissolved in 100 ml of acetone/hexane (20/80 vol/vol), stirring for about one hour, removing the solvent by evaporation and drying under vacuum at about 50° C., were melt compounded as in Control 6 but at a barrel temperature profile of 290° C./290° C.1290° C./290° C. and screw speed of 110 rpm.

Control 8: Polypthalamide A (70 parts by weight), ethylene-propylene-diene rubber, identified as Vistalon 3708 from Exxon (29.5 parts by weight), and citric acid (0.5 parts by weight) were melt compounded as in Control 6 but at a barrel temperature profile of 285° C./295° C./295° C./295° C. and screw speed of 70 rpm.

Control 9(a)–(c): Polyphthalamide A (70 parts by weight) and maleic anhydride-functionalized ethylene-propylene-diene rubber (30 parts by weight), prepared by combining 500 grams of an ethylene-propylene-diene rubber identified as Nordel 1500 from DuPont and 10.2 grams maleic anhydride and extruding the mixture in a Brabender ¾-inch single screw extruder at a temperature of about 240° C., were melt compounded as in Control 6 but at barrel temperature profiles of 280–285° C./290–295° C./290–295° C./290–295° C. and screw speeds of 60–90 rpm.

Control 10: Polyphthalamide A (80 parts by weight) and maleic anhydride-functionalized ethylene-propylene copolymer rubber as in Examples 28–30 (20 parts by weight) were melt compounded essentially as in Example 1 but at a barrel temperature profile of 351° F./450° F./534° F./562° F./605° F./605° F./605° F./582° F. and screw speed of 150 rpm.

Control 11: Components as in Control 10, together with the lubricant used in Example 7, in proportions of 92.5/7.5/0.25 parts by weight, were melt compounded using a ZSK-30 twin screw extruder following generally the procedure of Example 1.

Control 12: Polyphthalamide A (75 parts by weight) and an ethylene-vinyl acetate-glycidal methacrylate terpolymer identified as Igetabond B from Sumitomo Chemical Co., Ltd., (25 parts by weight) were melt compounded using a ZSK-30 twin screw extruder following generally the procedure of Example 1.

Control 13: Polyphthalamide A (92.5 parts by weight), an ethylene-methacrylic acid-butyl acrylate terpolymer containing 20% methacrylic acid units and having a melt index of 11 g/10 min., identified as Nucrel 010 from DuPont (7.5 parts by weight), and the lubricant used in Example 7 (0.25 parts by weight) were melt compounded using a ZSK-30 twin screw extruder following generally the procedure of Example 1.

Control 14: Polyphthalamide A (70 parts by weight) and the ethylene-acrylic acid copolymer as in Example 22 (30 parts by weight) were melt compounded using a ZSK-30) twin screw extruder following generally the procedure of Example 1.

Control 15: Components as in Control 14, in proportions of 85/15 parts by weight, were melt compounded using a ZSK-30 twin screw extruder following generally the procedure of Example 1.

Control 16: Components as in Control 14, in proportions of 90/10 parts by weight, were melt compounded using a ZSK-30 twin screw extruder following generally the procedure of Example 1.

Control 17: Components as in Control 14, in proportions of 95/5 parts by weight, were melt compounded using a ZSK-30 twin screw extruder following generally the procedure of Example 1.

Control 18: Polyphthalamide A (80 parts by weight) and a maleic anhydride-functionalized low-density polyethylene (20 parts by weight), prepared by combining 2964 grams low density polyethylene, identified as Dow 123, 30 grams maleic anhydride and 6 grams dicumyl peroxide and extruding the mixture in a Brabender ¾-inch single screw extruder at a temperature of about 230° C., were melt compounded as in Control 6 but at a barrel temperature profile of 275° C./290 ° C./290° C./290° C. and screw speed of 75 rpm.

Control 19: Polyphthalamide A (60 parts by weight) and the zinc-neutralized ethylene-methacrylic acid copolymer as in Example 18 (40 parts by weight) were melt compounded as in Control 6 but at a barrel temperature profile of 270° C./290° C./290° C./290° C. and screw speed of 70 rpm.

Control 20(a)–(f): Components were as in Control 19 in proportions of 70/30 parts by weight. Compounding procedures in Controls 20(a) and (d) followed generally the procedure of Example 1. In Control 20(b), a ¾-inch Brabender single screw extrudes was used with barrel temperature settings of 285° C./300° C./300° C./295° C. and screw speed of 60 rpm. In Control 20(c), an 80/20 parts by weight composition was prepared using the Brabender extruder with barrel temperature settings of 285° C./290° C./290° C./290° C. and screw speed of 80 rpm and then additional amounts of the components were added to the result to achieve a 70/30 parts by weight composition, which then was compounded using the Brabender extruder with barrel temperature settings of 285° C./290° C./290° C./290° C. and screw speed of about 65 rpm. In Control 20(e), a large twin screw extruder was used with barrel temperature settings ranging from about 212° C. at the feed end to about 325° C. at the exit zone, screw speed of 150 rpm, and with about 58 weight percent of the rubbery polymer fed with polyphthalamide A through the feed port and the remainder of the rubbery polymer fed downstream using a vent stuffer.

Control 21(a)–(c): Components were as in Control 19 in proportions of 80/20 parts by weight. Compounding in Control 21(a) employed a ¾-inch Brabender single screw extruder with barrel temperature settings of 290° C./325° C./325° C./285° C. and screw speed of 50 rpm. Compounding in Controls 21(b) and (c) followed generally the procedure of Example 1.

TABLE V

| Control | Notched IZOD (ft-lb/in) | YTS (kpsi) | EB (%) | HDT (° F.) |
|---|---|---|---|---|
| 6 | 1.3 | — | 6 | 238 |
| 7 | 1.4 | — | 3 | 223 |
| 8 | 1.0 | — | — | 232 |
| 9(a) | 12.6 | 8.9 | 33 | 231 |
| 9(b) | 2.4 | 8.5 | 17 | 234 |
| 9(c) | 2.3 | 8.4 | 18 | 239 |
| 10 | 17.6 | 9.2 | 33 | 238 |
| 11 | 2.6 | 13.0 | 14 | 244 |
| 12 | 1.8 | 8.4 | 35 | 210 |
| 13 | 2.1 | 14.2 | 15 | 250 |
| 14 | 4.5 | 9.0 | 57 | 221 |
| 15 | 3.6 | 12.0 | 20 | — |
| 16 | 3.1 | 14.4 | 20 | 241 |
| 17 | 1.7 | 15.2 | 15 | 244 |
| 18 | 4.6 | 12.1 | 25 | 240 |
| 19 | 22.4 | 7.9 | 70 | — |
| 20(a) | 11.1 | 9.8 | 27 | 239 |
| 20(b) | 8.7 | 9.7 | 28 | 240 |
| 20(c) | 22.2 | 9.6 | 40 | 240 |
| 20(d) | 18.3 | 10.1 | 41 | 238 |
| 20(e) | 17.4 | 10.2 | 49 | 240 |

TABLE V-continued

| Control | Notched IZOD (ft-lb/in) | YTS (kpsi) | EB (%) | HDT (° F.) |
|---|---|---|---|---|
| 20(f) | 4.3 | 10.0 | 20 | 242 |
| 21(a) | 4.3 | 11.4 | 25 | 248 |
| 21(b) | 15.4 | 11.7 | 23 | 248 |
| 21(c) | 12.5 | 12.2 | 32 | 237 |

As can be seen from these Controls and Table V, most of the rubbery polymers employed provided some improvement in Notched Izod impact strength relative to the neat polyphthalamide component, although in many cases the improvement was insignificant. It also can be seen that the most significant improvements were achieved with the functionalized rubbery polymers used in Controls 10 and 19–21. However, from Controls 20 and 21, it can be seen that there was variability in the degree of improvement achieved for a given composition.

EXAMPLES 31–32

Following generally the procedure of Example 1, compositions were prepared from Polyphthalamide A, the modified styrene-ethylene/butylene-styrene copolymer used in Examples 1–30, and various additional components. Test specimens were prepared and tested as in Example 1 and results are reported in Table VI. The compositions prepared and tested in these examples were as follows:

Example 31: Polyphthalamide A (80 parts by weight), modified block copolymer as in Example 1 (15 parts by weight), and commercial polypropylene resin having a melt flow rate of about 4 g/10 min. from Amoco Chemical Company (5 parts by weight).

Example 32: Polyphthalamide A (80 parts by weight), modified block copolymer as in Example 1 (20 parts by weight), and polytetrafluoroethylene powder, identified as Polylube J14 from Custom Compounding, Inc. (0.1 part by weight).

TABLE VI

| Example | Notched IZOD (ft-lb/in) | YTS (kpsi) | EB (%) | FM (kpsi) | HDT (° F.) |
|---|---|---|---|---|---|
| 31 | 12.9 | 11.0 | 21 | 429 | — |
| 32 | 17.8 | 10.2 | 29 | 330 | 235 |

As can be seen from Example 32 and Table VI, properties of the polytetrafluroethylene-containing composition were essentially unchanged from those of Example 1, in which equal parts polyphthalamide and modified block copolymer components were present. The polytetrafluoroethylene used in Example 32 did provide improvements in injection moldability, however. Inclusion of 5 parts by weight polypropylene in Example 31 reduced Izod impact strength as compared to the composition of Example 3, containing 85 parts by weight Polyphthalamide A and 15 parts by weight modified block copolymer, however, flexural modulus of the polypropylene-containing composition was significantly increased.

COMPARATIVE EXAMPLE

Following generally the procedure of Example 1, except melt extrusion temperature was 578° F., throughput was 25 pounds per hour and screw speed was 300 rpm and injection molding was conducted at barrel zone temperatures of 430° F., 515° F., and 560° F. and a mold temperature of 200° F., a composition containing 80 parts by weight commercial nylon 66, identified as Zytel® 101 from DuPont, and 20 parts by weight modified block copolymer as in Example 1 was prepared and molded into test specimens (Sample 1) and tested. Following essentially the same procedure, at screw speed of 125 rpm, throughput of 30 pounds per hour, barrel temperature profile of 355° F./444° F./521° F./526° F./532° F./534° F./556° F./554° F. and under vacuum of 15 inches Hg, a second sample (Sample 2) was prepared from 80 parts by weight of the nylon 66, 3.5 parts by weight of the modified block copolymer, 16.5 parts by weight of the ethylene-acrylic acid copolymer used in Example 22 and 0.25 parts by weight of the lubricant used in Example 7, and the composition was molded and tested. Molding was at barrel temperature settings of 538° F./550° F./550° F. and mold temperature of 150° F. Tests also were performed on specimens (Sample 3) prepared from the nylon 66 resin. Results are reported in Table VII.

TABLE VII

| Sample | Notched IZOD (ft-lb/in) | YTS (kpsi) | EB (%) | FM (kpsi) | HDT (° F.) |
|---|---|---|---|---|---|
| 1 | 9.8 | 8.1 | 28 | 293 | 144 |
| 2 | 2.0 | 8.5 | 28 | — | 147 |
| 3 | 0.8 | 13.3 | 26 | 467 | 193 |

As shown in the comparative example and the table, Notched Izod impact strength of the Sample 1 compositions, while improved relative to the neat nylon 66 of Sample 3, was significantly less than the 80/20 compositions according to the invention in Example 1. Further, mechanical and thermal properties decreased to a greater extent in the comparative composition than in that of Example 1. It is to be noted, however, that screw speed during preparation of the Sample 1 composition was greater than that in Example 1 and that may have prevented achieving optimum properties. Comparing Sample 2, which was prepared at lower screw speed, with the composition of Example 22, containing Polyphthalamide A, the modified block copolymer, ethylene-acrylic acid copolymer and lubricant in proportions of 80/4/16/0.2, it can be seen that only a slight improvement in Izod impact strength was achieved with Sample 2 while a dramatic increase in Izod impact strength was achieved in Example 22. The better performance of the invented compositions is all the more impressive considering that preparation thereof and preparation of test specimens therefrom were conducted at temperatures exceeding nominal degradation temperature of the modified block copolymer while temperatures in the comparative example were below the nominal degradation temperature.

As noted herein, the improvement in mechanical properties and particularly toughness realized when adding pendant succinic anhydride-functionalized block copolymer modifier to polyterephthalamides also extends to filled polyterephthalamide compositions, particularly including compositions comprising up to 60 wt % reinforcing fiber. The toughening is particularly beneficial in molding formulations for improving weldline strength. Weldline areas within a molded article are an inherent result of the injection molding process and may also be found in extruded goods. Many widely-used injection-moldable thermoplastics, particularly high temperature molding resins, suffer to some extent from increased brittleness and reduced strength in weldline areas, particularly when filled. The art continually seeks means for minimizing weldline problems, among them improved design of the dies and molds, better molding processes, and use of resin additives.

In the following examples, polyterephthalamides and copolyterephthalamides filled with reinforcing fiber are shown to be toughened by including a pendant succinic anhydride-functionalized block copolymer modifier, the copolymer comprising polymerized styrene blocks and rubber blocks comprising ethylene/propylene, ethylene/butylene, or ethylene/pentylene polymer blocks, or combinations of such blocks. Of particular importance is the reduced loss in weldline toughness for molded specimens.

The materials used in the following examples include:

Polyphthalamide A: Hexamethylene terephthalamide-adipamide-isophthalamide terpolymer, mole ratio 65/10/25. Obtained as Amodel® 1000 polyphthalamide from Amoco Chemical Company.

Polyphthalamide B: Hexamethylene terephthalamide-adipamideterpolymer, mole ratio 65/35. Obtained as Amodel® X4000 polyphthalamide from Amoco Chemical Company.

Glass Fiber: Chopped glass fiber, nominal dimensions 9.0 micron diameter and 0.1–0.2 in. length, obtained from Owens-Corning Company as OCF-492.

Modifier: Maleic anhydride-functionalized styrene-ethylen/butylene styrene block copolymer containing about 29 wt. % polymerized styrene and about 2 wt % pendant succinic anhydride groups, obtained as Kraton® FG1901X polymer from Shell Chemical Company.

The processes described and used in the following examples to provide such toughened filled articles will be seen to be the processes and procedures commonly employed in the resin art for the production of molded glass-filled resin compositions. Mechanical properties are room temperature properties, determined according to ASTM published procedures D638 (tensile properties), D-79058T (flexural properties), and D-256-56 (notched Izod impact) unless otherwise noted.

Substantially the same processes and conditions were used with commercial resins to provide and test control specimens. Test results may vary from published data for commercial materials processed in different equipment under other processing conditions.

EXAMPLES 33–46

Glass reinforced polyterephthalamide compositions were prepared by extrusion compounding the polyterephthalamide, glass fiber, and modifier. The dried polymer components were first mixed in a tumble mixer, together with stabilizers when employed, then fed to the first feed port of a ZE 25 Berstorff extruder. The glass fiber was added to the melt downstream at the rate necessary to achieve the desired fiber loading. The melt temperatures during the extrusion ranged generally from 320° to about 335° C., depending in part on the polyamide employed and the ratio of polyamide to modifier. The extrudate, after cooling in a water bath, was chopped and then vacuum dried before being injection molded using an HPM 75 ton molding machine to form test specimens. Gating for 0.375" thick tensile bars was 0.20"×0.15", and for 0.125" thick bars was 0.125" square. Comparison Examples C-33 through C-37 comprising Nylon 6,6 were similarly prepared but using melt temperatures about 45° lower.

The compositions and properties of molded, fiber-filled articles are summarized in Table VIII. The glass fiber levels for all examples are the nominal levels, determined on the basis of material charged; actual values are ±3 wt %.

TABLE VIII

| | | Example No. | | | |
|---|---|---|---|---|---|
| | | 33 | 34 | 35 | 36 |
| Polyphthalamide A | pbw | 67 | 65.7 | 64.3 | 63.0 |
| Modifier | pbw | 0 | 1.3 | 2.7 | 4.0 |
| (wt% on resins) | | 0 | 1.9 | 4.0 | 6.0 |
| Glass Fiber | pbw | 33 | 33 | 33 | 33 |
| Thin Tensile Bar Properties: | | | | | |
| Izod Impact | ft lb/in notch | 2.0 | 2.0 | 1.9 | 2.0 |
| Tensile Strength | psi | 35,700 | 35,100 | 33,800 | 33,900 |
| Elongation | % | 2.4 | 2.5 | 2.6 | 2.8 |
| Thick Tensile Bar Properties: | | | | | |
| Tensile Strength | psi | 27,200 | 30,400 | 33,800 | 33,600 |
| Weldline Strength | psi | 12,000 | 13,600 | 14,200 | 14,800 |

Note:
"Thin" tensile bars are 0.125" thick; "Thick" tensile bars are 0.375" thick.

It will be apparent from the data for Examples 33–36 that the addition of pendant succinic anhydride-functionalized block copolymer modifier significantly improves the tensile properties of filled polyphthalamide compositions in thick molded specimens, and does not seriously affect properties in thin moldings. Also significant is the improvement in weldline strength exhibited by the thick molded specimens when compared with the formulation of Example 33 without modifier.

In the following Table IX are presented the test data for Comparison Examples C-33 through C-37 comprising Nylon 6,6.

TABLE IX

| | | Comparison Example No. | | | | |
|---|---|---|---|---|---|---|
| | | C-33 | C-34 | C-35 | C-36 | C-37 |
| Nylon 6,6 | pbw | 67 | 65.3 | 63.6 | 55 | 52 |
| Modifier | pbw | 0 | 1.7 | 3.4 | 0 | 2.8 |
| (wt % on resins) | | 0 | 2.5 | 5.0 | 0 | 5.1 |
| Glass Fiber | pbw | 33 | 33 | 33 | 45 | 45 |
| Thin Tensile Bar Properties: | | | | | | |
| Izod Impact | ft lb/in notch | 2.3 | 2.5 | 2.8 | 3.0 | 3.2 |
| Tensile Strength | psi | 30,200 | 29,400 | 28,000 | 34,100 | 30,100 |
| Thick Tensile Bar Properties | | | | | | |
| Tensile Strength | psi | 31,800 | | 29,300 | 36,700 | 33,700 |

Note:
"Thin" tensile bars are 0.125" thick; "Thick" tensile bars are 0.375" thick.

It will be apparent that the tensile properties for filled Nylon 6,6 formulations at intermediate (33%) and high (45%) loading levels of glass fiber are reduced by the addition of pendant succinic anhydride-functionalized block copolymer modifier.

In the following Table X, mechanical properties are provided for filled blends over a wider range of from 015.5 wt % modifier, calculated on the basis of resin component.

TABLE X

| | | Example No. | | | | |
|---|---|---|---|---|---|---|
| | | 37 | 38 | 39 | 40 | 41 |
| Polyphthalamide A | pbw | 64.3 | 62.3 | 60.3 | 57.3 | 54.3 |
| Modifier | pbw | 0 | 2 | 4 | 7 | 10 |
| (wt % on resins) | | 0 | 3.1 | 6.2 | 10.8 | 15.5 |
| Stabilizer | pbw | 1.19 | 1.19 | 1.19 | 1.19 | 1.19 |
| Glass Fiber | pbw | 34.5 | 34.5 | 34.5 | 34.5 | 34.5 |
| Thin Tensile Bar Properties: | | | | | | |
| Izod impact | ft lb/in notch | 2.0 | 2.1 | 2.2 | 1.8 | 1.7 |
| Tensile Strength | psi | 30,200 | 31,600 | 29,700 | 20,900 | 15,600 |

Note:
All formulations include 1.19 pbw commercial stabilizer package obtained from Amoco Performance Products Inc.; "Thin" tensile bars are 0.125" thick; "Thick" tensile bars are 0.375" thick.

It will be seen that for thin molded specimens, tensile properties are improved at lower levels of modifier, while for higher levels of modifier, levels of 10 wt % and above, the tensile strength is sharply reduced. The apparent sharp loss in toughness for these levels of a rubbery additive in filled polyphthalamides is surprising and unexpected.

In the following examples 42–48, mechanical properties were determined for filled formulations with a high loading of glass fiber (46%), using up to 10 wt % modifier, based on resin content. The effect of gating and pack size on tensile properties was also determined for thick tensile bars. These specimens were compounded using a Werner and Pfliederer ZSK 40 extruder. The compositions and test results are summarized in Tables XI and XII

TABLE XI

| | | Example No. | | | | |
|---|---|---|---|---|---|---|
| | | 42 | 43 | 44 | 45 | 46 |
| Polyphthalamide A | pbw | 54 | 52.9 | 51.8 | 49.7 | 48.6 |
| Modifier | pbw | 0 | 1.1 | 2.2 | 4.3 | 5.4 |
| (wt % on resins) | | 0 | 2.0 | 4.1 | 8.0 | 10.0 |
| Glass Fiber | pbw | 46 | 46 | 46 | 46 | 46 |
| Thin Tensile Bar Properties: | | | | | | |
| Tensile Strength | psi | 41,700 | 40,100 | 39,400 | 34,500 | 32,900 |
| Elongation | % | 2.7 | 2.9 | 3.0 | 2.6 | 2.6 |
| Flexural Strength | psi | 59,500 | 59,500 | 58,600 | 53,700 | 50,000 |
| Flexural Modulus | psi | $2.5 \times 10^6$ | $2.5 \times 10^6$ | $2.4 \times 10^6$ | $2.2 \times 10^6$ | $2.1 \times 10^6$ |
| Izod Impact | ft lb/in notch | 2.5 | 2.5 | 2.5 | 2.6 | 2.6 |
| Rev. Izod | ft lb/in notch | 16.2 | 18.2 | 18.5 | 15.1 | 14.4 |
| Thick Tensile Bar Properties: | | | | | | |
| Tensile Strength gate size = 0.10" × 0.15" | psi | 27,400 | 30,500 | 36,800 | 34,500 | 32,900 |
| gate size = 0.15" × 0.20" | | 33,800 | 37,300 | 38,400 | 36,600 | 35,100 |
| gate size = 0.21" × 0.34" | | 38,100 | 41,600 | 40,500 | 37,100 | 35,100 |

TABLE XI-continued

| | Example No. | | | | |
|---|---|---|---|---|---|
| | 42 | 43 | 44 | 45 | 46 |
| gate size = 0.25" × 0.50" | 39,300 | 42,200 | 40,700 | 37,700 | 35,100 |

Note:
Rev. Izod is standard Izod Impact test, but run with notch opposite the impacted face; "Thin" tensile bars are 0.125" thick; "Thick" tensile bars are 0.375" thick.

It will again be apparent that mechanical properties of filled polyphthalamides are improved by the modifier at low levels, but detrimentally affected at higher levels of modifier, above about 8 wt % based on resin components. The gate size employed in molding also affects mechanical properties; however, significant loss in mechanical properties is apparent above about 8 wt % modifier based on resin components for all gate sizes.

In the following examples, pack times were varied between 6 and 24 seconds.

TABLE XII

| | | Example No. | |
|---|---|---|---|
| | | 47 | 48 |
| Polyphthalamide A | pbw | 55.0 | 52.0 |
| Modifier | pbw | 0 | 3.0 |
| (wt % on resins) | | 0 | 5.4 |
| Glass Fiber | pbw | 45 | 45 |
| Thin Tensile Bar Properties: (gate size = 0.10" × 0.15") | | | |
| Tensile Strength | psi | 20,500 | 32,500 |
| Weldline Strength | psi | 7,500 | 11,000 |
| Thick Tensile Bar Properties: (gate size = 0.15" × 0.20") | | | |
| Tensile Strength | psi | 26,500 | 35,000 |
| Weldline Strength | psi | 11,500 | 15,500 |

Note: All formulations include 1.19 pbw commercial stabilizer package obtained from Amoco Performance Products Inc.; "Thin" tensile bars are 0.125" thick; "Thick" tensile bars are 0.375" thick.

Again it will be apparent that tensile strength and weldline strength of filled polyphthalamide formulations are significantly improved by incorporating a pendant succinic anhydride-functionalized block copolymer modifier.

The utility of the invented method for toughening filled polyphthalamides is again apparent in the following examples 49 and 50 comprising a hexamethylene terephthalamide—adipamide 65/35 copolymer.

TABLE XIII

| | | Example No. | |
|---|---|---|---|
| | | 49 | 50 |
| Polyphthalamide B | pbw | 65.5 | 60 |
| Modifier | pbw | 0 | 4.5 |
| (wt % on resins) | | 0 | 7.0 |
| Glass Fiber | pbw | 34.5 | 34.5 |

TABLE XIII-continued

| | | Example No. | |
| --- | --- | --- | --- |
| | | 49 | 50 |
| Thick Tensile Bar Properties: | | | |
| Tensile Strength | psi | 23,400 | 28,300 |
| Weldline Strength | psi | 9,500 | 13,100 |

Note: All formulations include 1 pbw commercial stabilizer package obtained from Amoco Performance Products Inc.; "Thick" tensile bars are 0.375" thick.

Other factors that may affect the efficiency of the modifier in toughening polyphthalamides includes the presence of amine endgroups on the polymer, produced by carrying out the polymerization with a small excess of the diamine component. In the following examples 51 and 52, summarized in Table XIV, the effect of amine-rich stoichiometry on tensile strength and weldline strength will be apparent.

TABLE XIV

| | | Example No. | |
| --- | --- | --- | --- |
| | | 49 | 50 |
| Polyphthalamide A | pbw | 52.0 | 52.0 |
| inherent viscosity | dl/g | 0.94 | 0.94 |
| excess amine | % | 0.6 | 0.01 |
| Modifier | pbw | 3.0 | 3.0 |
| (wt % on resins) | | 5.5 | 5.5 |
| Glass Fiber | pbw | 45 | 45 |
| Thick Tensile Bar Properties: | | | |
| Tensile Strength | psi | 36,000 | 33,900 |
| Weldline Strength | psi | 15,000 | 13,000 |

Note: All formulations include 1 pbw commercial stabilizer package obtained from Amoco Performance Products Inc. and 1.5 pbw CPTA0001 carbon black concentrate; "Thick" tensile bars are 0.375" thick.

The invention will thus be seen to be a polyamide composition comprising polyterephthalamides toughened by including a pendant succinic anhydride-functionalized block copolymer modifier, the copolymer comprising polymerized styrene blocks and rubber blocks comprising ethylene/propylene, ethylene/butylene, or ethylene/pentylene polymer blocks, or combinations of such blocks.

More particularly, the polyamide compositions according to the invention will comprise a polyphthalamide having at least 50 mole per cent recurring aliphatic terephthalamide units and a modifier comprising a pendant succinic anhydride-functionalized block copolymer polymerized styrene blocks and rubber blocks comprising ethylene/propylene, ethylene/butylene or ethylene/pentylene polymer blocks, or a combination of such blocks. Preferred compositions will comprise from about 50 to about 99 parts by weight (pbw), more preferably from about 70 to about 99 pbw polyphthalamide component and from about 1 to about 50 parts by weight, preferably from about 1 to about 30 pbw of the modifying component. When combined with up to about 60 wt %, preferably from about 10 to about 60 wt % particulate filler or structural fiber, either as continuous fiber or in the form of chopped or short fibers, flock, fiber pulp, fibrils or the like, the filled blends of this invention are useful in forming laminates and structural composites and filled molded and extruded articles. Preferably the fiber will be chopped or milled glass fiber or carbon fiber, more preferably glass fiber. The most preferred filled polyphthalamide formulations will comprise from about 1 to about 10 pbw, still more preferably from about 1 to about 8 pbw modifier, and from about 90 to about 99 pbw, still more preferably from about 92 to about 99 pbw polyphthalamide component. Although higher levels of the additive in the filled formulations may be employed if desired for particular purposes, in general a surprising loss in toughness will be seen when the additive component significantly exceeds about 10 pbw.

The preferred polyphthalamide may be further described as a polyterephthalamide comprising greater than 50 mole % terephthalamides of one or more straight chain, branched or cyclic $C_4$–$C_{14}$ aliphatic diamines, and may optionally include up to about 50 mole % additional carbonamide units, such as aliphatic or aromatic dicarboxylic diamines of the aforesaid diamines. More preferred are copolyterephthalamides derived from mixtures of aliphatic diamines including straight and branched chain $C_4$–$C_{14}$ aliphatic diamines, as well as those derived from mixtures of terephthalic acid or a derivative with up to 50 mole % other dicarboxylic acids or their derivatives. Particularly preferred are polyterephthalamides derived from hexamethylene diamine and at least one branched aliphatic alkylene diamine such as 2-methylpentamethylene diamine, 2,2,4-trimethylhexamethylene diamine, 2,4-dimethylhexamethylene diamine or the like; terephthalamides of such diamine mixtures with up to 50 mole % of additional dicarboxylic diamide components such as the corresponding adipamides or isophthalamides; and polyphthalamides comprising from about 50 to about 90 mole % hexamethylene terephthalamide, from about 50 to about 10 mole % hexamethylene adipamide, and from about 0 to about 30 mole % hexamethylene isophthalamide. The invention may also be characterized as a method for improving the toughness of polyamides, particularly copolyterephthalamides having at least 50 mole per cent recurring aliphatic terephthalamide units, the method comprising compounding the polyphthalamide with up to 50 wt %, preferably from about 1 to about 30 wt % modifier comprising a pendant succinic anhydride-functionalized block copolymer polymerized styrene blocks and rubber blocks comprising ethylene/propylene, ethylene/butylene or ethylene/pentylene polymer blocks, or a combination of such blocks, the proportions based on total resin components. The method of this invention is particularly effective for improving the toughness of filled polyamides having up to about 60 wt %, preferably from about 5 to about 50 wt % particulate filler or structural fiber, either as continuous fiber or in the form of chopped or short fibers, flock, fiber pulp, fibrils or the like, when modifier levels of from about 1 to about 10 wt %, preferably from about 1 to about 8 wt %, based on resin components are employed.

Although the invention has been described and illustrated by way of specific embodiments set forth herein, those skilled in the art will recognize that alternative modifiers and polyamides within the description of the invention are available or may be readily obtained and used. Still further modifications and variations will be readily apparent to those skilled in the resin formulating and composite fabricating art, and such variations and modifications will be included within the scope of the invention as defined by the appended claims.

What is claimed is:

1. A filled polyamide composition consisting of:

(a) from about 99 to about 92 wt %, based on resin components (a) and (b), of a polyphthalamide consisting of recurring units represented by the formula:

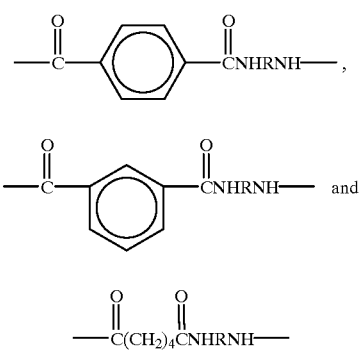

wherein the mole ratio of A:B:C units lies in range 100–50:0–35:0–50, and wherein R comprises at least one divalent aliphatic radical having from 4 to 14 carbon atoms;

(b) from about 1 to about 8 wt % based on resin components (a) and (b) of a pendant succinic anhydride-functionalized block copolymer comprising polymerized styrene blocks and rubber blocks comprising ethylene/propylene, ethylene/butylene or ethylene/pentylene polymer blocks or a combination thereof;

(c) from about 10 to about 60 wt %, based on total composition, of at least one filler selected from particulate filler and structural fiber; and (d) from 0 to 200 pbw, per hundred parts combined weight of components (a) and (b), of at least one additional component selected from the group consisting of pigments, colorants, stabilizing additives, and lubricants.

2. The polyamide composition of claim 1 wherein the functionalized block copolymer comprises about 5 to about 50 weight percent polymerized styrene.

3. The polyamide composition of claim 1 wherein the functionalized block copolymer comprises about 0.5 to about 5 weight percent pendant succinic anhydride groups.

4. The polyamide composition of claim 1 wherein the functionalized block copolymer comprises a succinic anhydride-modified, hydrogenated block copolymer of styrene and 1,3-butadiene.

5. The polyamide composition of claim 1 wherein the functionalized block copolymer comprises a succinic anhydride-modified, hydrogenated block copolymer of styrene and isoprene.

6. A molded article comprising the filled polyamide composition of claim 1.

7. A blend consisting of the polyamide composition of claim 1 and at least one polyalphaolefin selected from the group consisting of polyethylene, polypropylene, poly-1-butene and poly4-methyl-1-pentene.

* * * * *